(12) United States Patent
Wu

(10) Patent No.: US 8,049,977 B2
(45) Date of Patent: Nov. 1, 2011

(54) LENS MODULE

(75) Inventor: Cheng-Shiun Wu, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 4 days.

(21) Appl. No.: 12/693,451

(22) Filed: Jan. 26, 2010

(65) Prior Publication Data

US 2010/0290136 A1  Nov. 18, 2010

(30) Foreign Application Priority Data

May 18, 2009  (CN) .......................... 2009 1 0302397

(51) Int. Cl.
    *G02B 7/02*  (2006.01)
(52) U.S. Cl. ..................................... 359/819
(58) Field of Classification Search ........... 359/819–823
    See application file for complete search history.

(56) References Cited

U.S. PATENT DOCUMENTS

| 3,758,200    | A  | * | 9/1973 | Saito ........................... 359/892 |
| 6,452,732    | B1 | * | 9/2002 | Okada et al. .................. 359/813 |
| 2006/0028573 | A1 | * | 2/2006 | Seo et al. ..................... 348/340 |

* cited by examiner

*Primary Examiner* — Ricky Mack
*Assistant Examiner* — Tuyen Tra
(74) *Attorney, Agent, or Firm* — Altis Law Group, Inc.

(57) ABSTRACT

A lens module includes a lens barrel, a lens mounted to the lens barrel, and an anti-dazzling film received in the lens barrel. The anti-dazzling film defines at least two first postholes. The lens module further includes at least two positioning posts. The positioning posts integrate with the first postholes to secure the anti-dazzling film to the lens barrel.

6 Claims, 7 Drawing Sheets

LENS MODULE

BACKGROUND

1. Technical Field

The present disclosure relates to lens modules and, particularly, to a lens module capable of preventing the center of an aperture of an anti-dazzling film from departing from the optic axis of the lens module.

2. Description of Related Art

Normally, an anti-dazzling film is secured to a lens barrel of a lens module using adhesive material. However, as the anti-dazzling film is usually so thin, using adhesive material may easily cause the center of an aperture of the anti-dazzling film to depart from the optic axis of the lens module, which decreases the quality of images captured by the lens module.

BRIEF DESCRIPTION OF THE DRAWINGS

The components of the drawings are not necessarily drawn to scale, the emphasis instead being placed upon clearly illustrating the principles of a lens module. Moreover, in the drawings, like reference numerals designate corresponding parts throughout several views.

DETAILED DESCRIPTION

Figure 1:
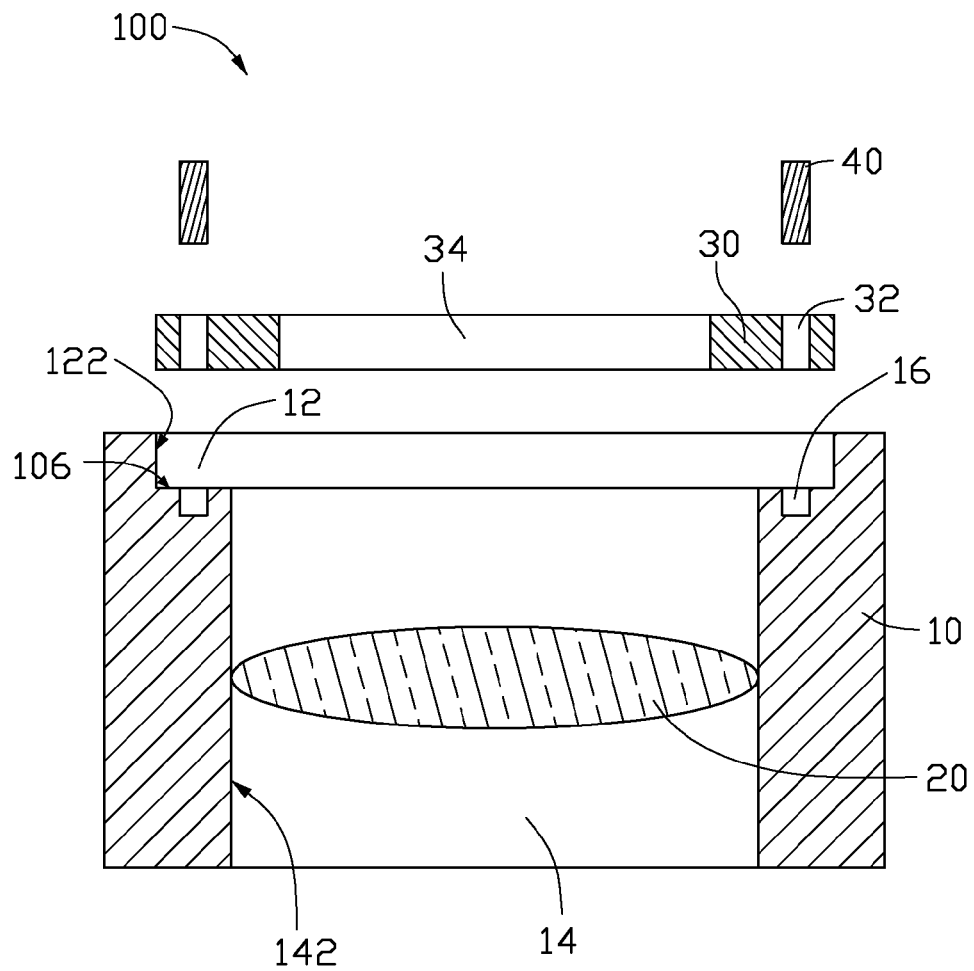
FIG. 1 is a cross-sectional view of a lens module in accordance with a first embodiment, showing an anti-dazzling film separated from a lens barrel of the lens module.
Figure 2:
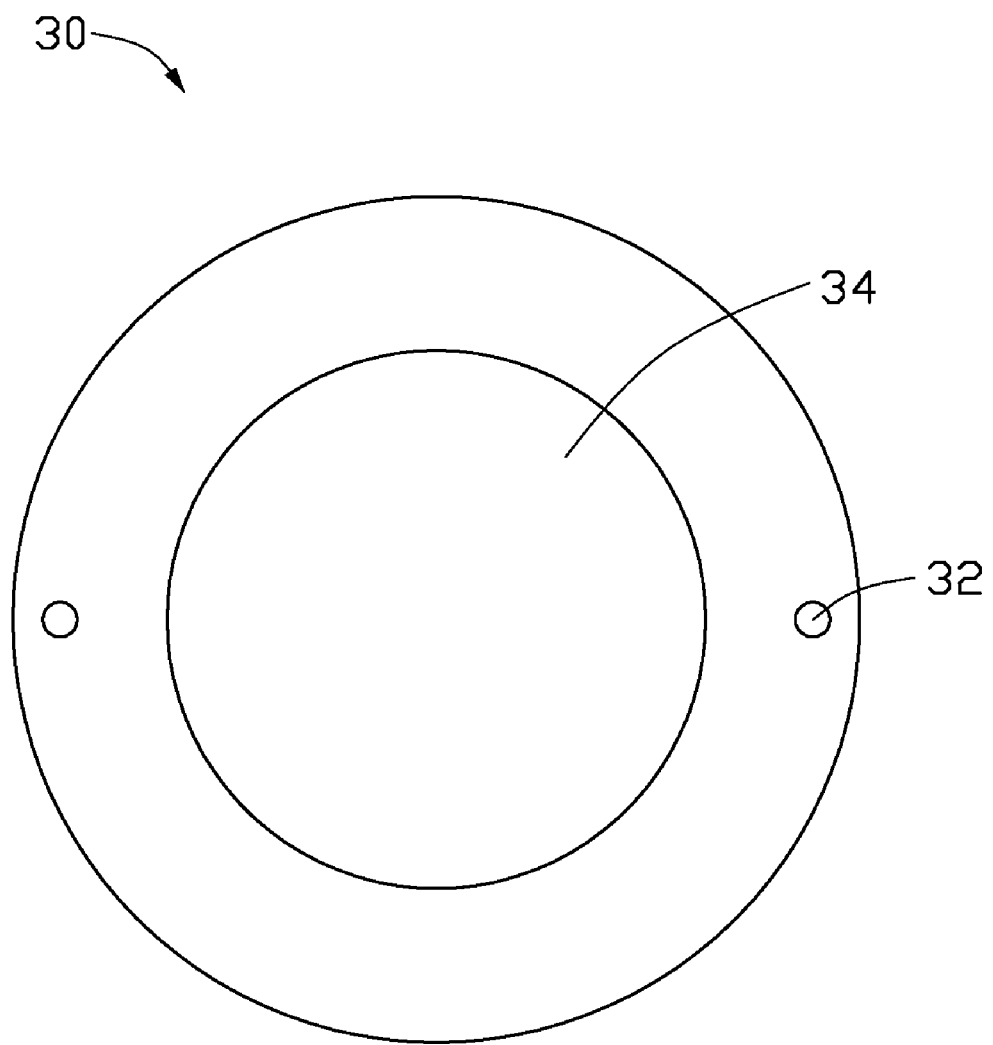
FIG. 2 is a top plan view of the anti-dazzling film of the lens module of FIG. 1.
Figure 3:
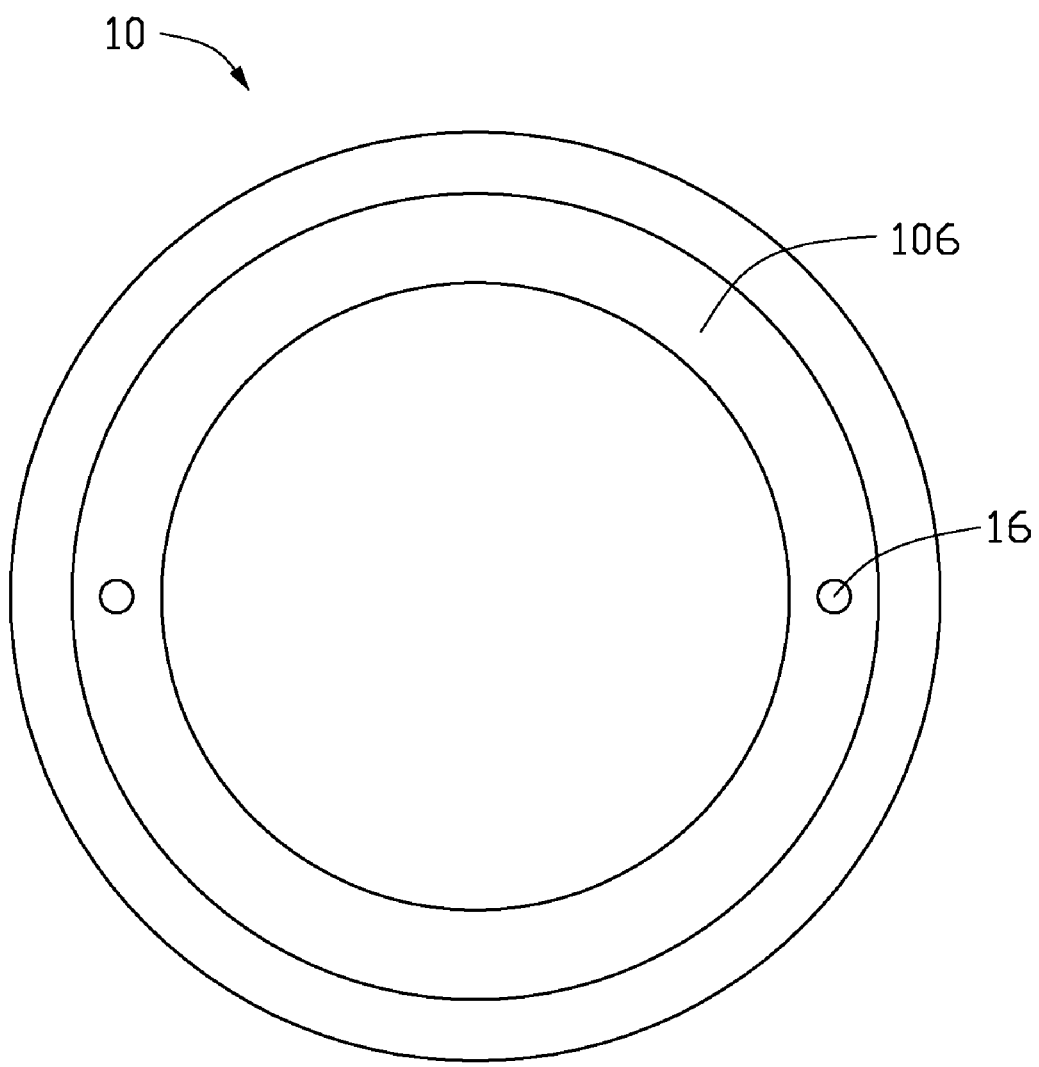
FIG. 3 is a top plan view of the lens barrel of the lens module of FIG. 1.
Figure 4:
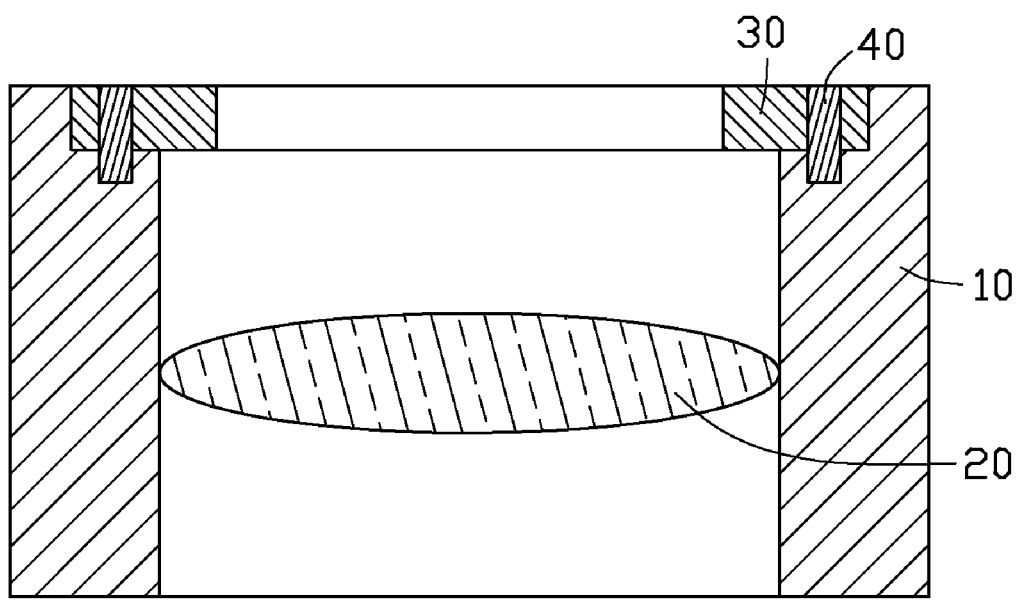
FIG. 4 is a cross-sectional view of the lens module, showing the anti-dazzling film secured to the lens barrel.

Referring to FIGS. 1-4, a lens module 100 includes a lens barrel 10, a lens 20, and an anti-dazzling film 30. The lens 20 and the anti-dazzling film 30 are received in the lens barrel 10. The lens module 100 further includes at least two positioning posts 40. The film 30 defines at least two first postholes 32 adapted for the positioning posts 40. The positioning posts 40 integrate with the first postholes 32 to secure the film 30 to the lens barrel 10.

The lens barrel 10 defines a first receiving hole 12 and a second receiving hole 14 communicating with the first receiving hole 12. The first receiving hole 12 is configured for receiving the film 30, and the second receiving hole 14 is configured for receiving the lens 20. The diameter of the first receiving hole 12 is larger than that of the second receiving hole 14. The first receiving hole 12 includes an inner sidewall 122, and the second receiving hole 14 includes an inner sidewall 142. An internal lip 106 is formed on the lens barrel 10 connecting the inner sidewall 122 to the inner sidewall 142. The lip 106 defines at least two second postholes 16 parallel to the optic axis of the lens module 100. Each of the second postholes 16 integrates with a first posthole 32 to receive one positioning post 40.

The film 30 further defines an aperture 34. When the film 30 is secured to the lens barrel 10, the center of the aperture 34 is on the optic axis of the lens module 100.

The positioning posts 40 integrate with the first postholes 32 and the second postholes 16 to secure the film 30 to the lens barrel 10, thus affixing the center of the aperture 34 to the optical axis of the lens module 100. Thus, the process of mounting the film 30 to the lens module 100 becomes easier.

Figure 5:
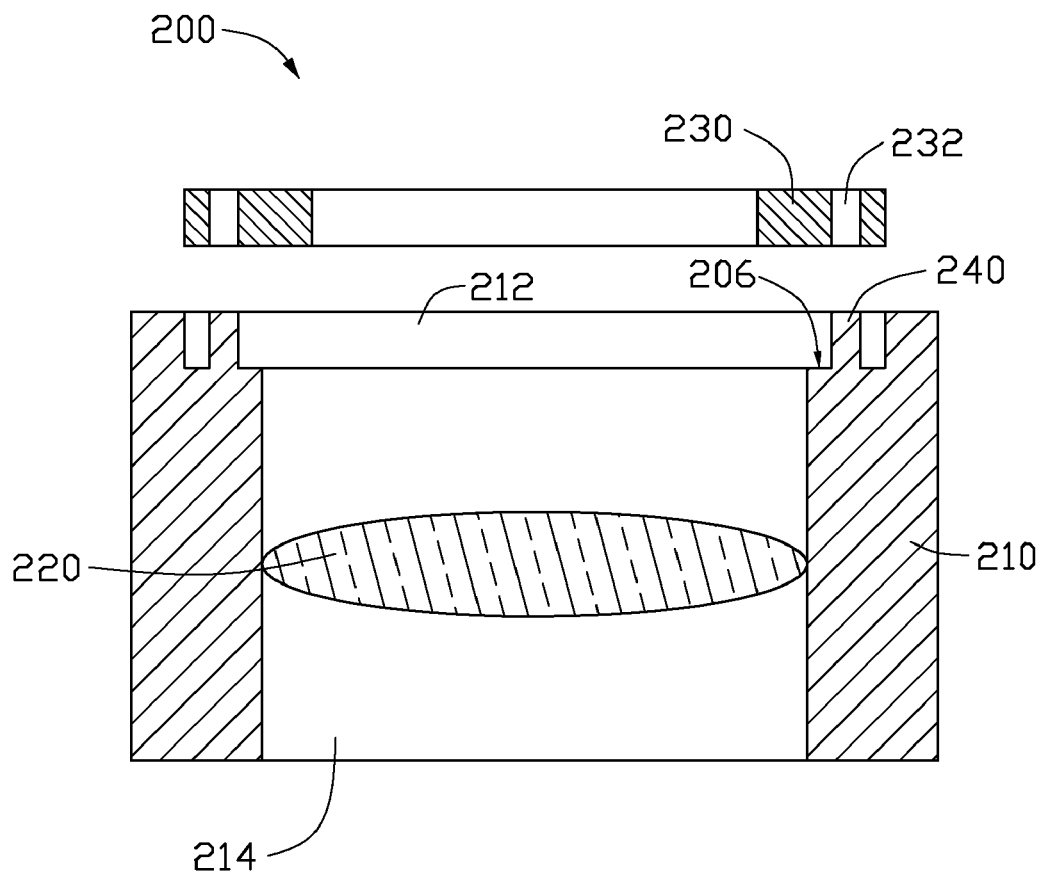
FIG. 5 is a cross-sectional view of a lens module in accordance with a second embodiment.

Referring to FIG. 5, another lens module 200 slightly different from the lens module 100 is illustrated. The lens module 200 includes a lens barrel 210, a lens 220, and an anti-dazzling film 230. The lens barrel 210 defines a first receiving hole 212 for receiving the film 230 and a second receiving hole 214 for receiving the lens 220. An internal lip 206 is formed on the lens barrel 210 for connecting the first receiving hole 212 to the second receiving hole 214. At least two positioning posts 240 protrude from the lip 206 and extend upwards parallel to the optic axis of the lens module 200. The film 230 defines at least two postholes 232. The positioning posts 240 integrate with the postholes 232 to secure the film 230 to the lens barrel 210.

Comparing to the lens module 100, the positioning posts 240 of the lens module 200 is integrally formed with the lens barrel 210.

Figure 6:
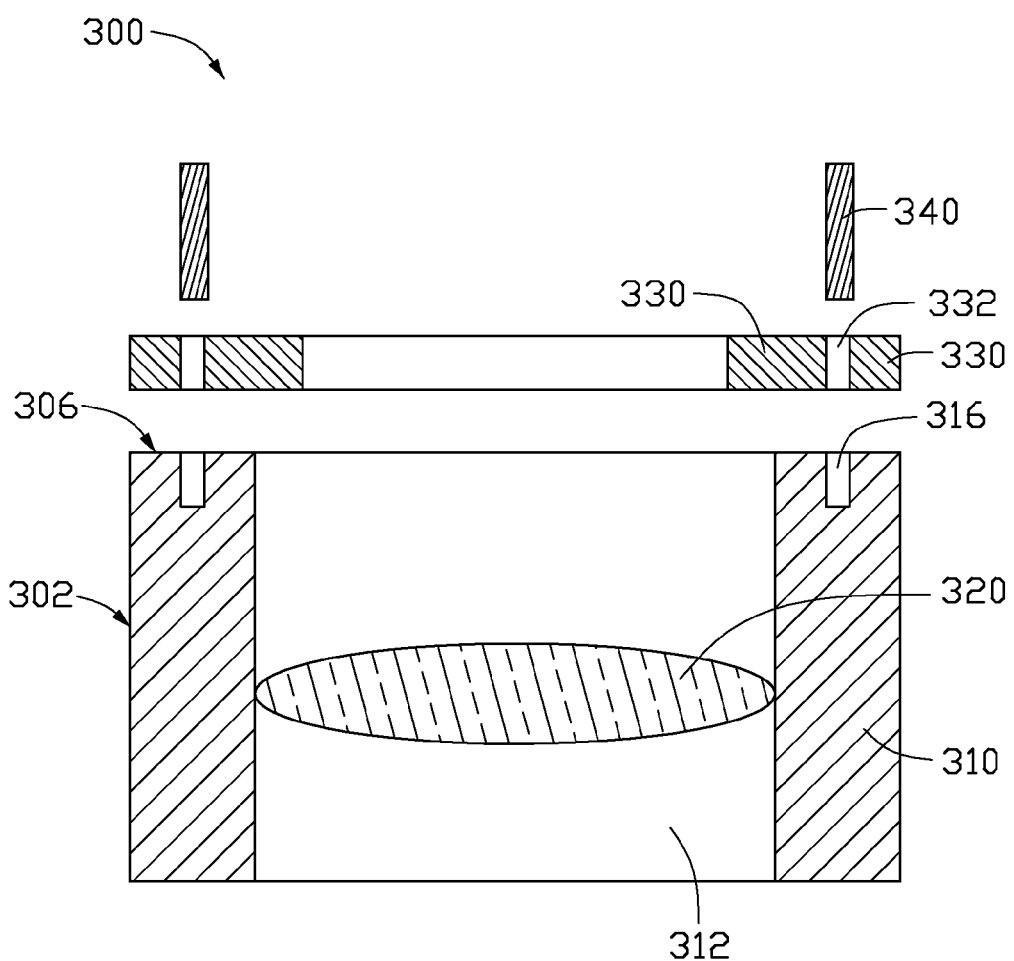
FIG. 6 is a cross-sectional view of a lens module in accordance with a third embodiment.

Referring to FIG. 6, a lens module 300 different from the lens module 100 is illustrated. The lens module 300 includes a lens barrel 310, a lens 320, an anti-dazzling film 330, and at least two positioning posts 340. The lens barrel 310 defines a receiving hole 312 for receiving the lens 320. The film 330 defines at least two first postholes 332. An internal lip 306 is formed on the top of the lens barrel 310. The lip 306 defines at least two second postholes 316 extending downwards parallel to the optic axis of the lens module 300. The positioning posts 340 integrate with the first postholes 332 and the second postholes 316 to secure the film 330 to the lens barrel 310.

Comparing to the lens module 100, the positioning posts 340 of the lens module 300 also integrate with the first postholes 232 and the second postholes 316 to secure the film 330 to the lens barrel 310, but the lens module 300 does not define a receiving hole for receiving the film 330.

Figure 7:
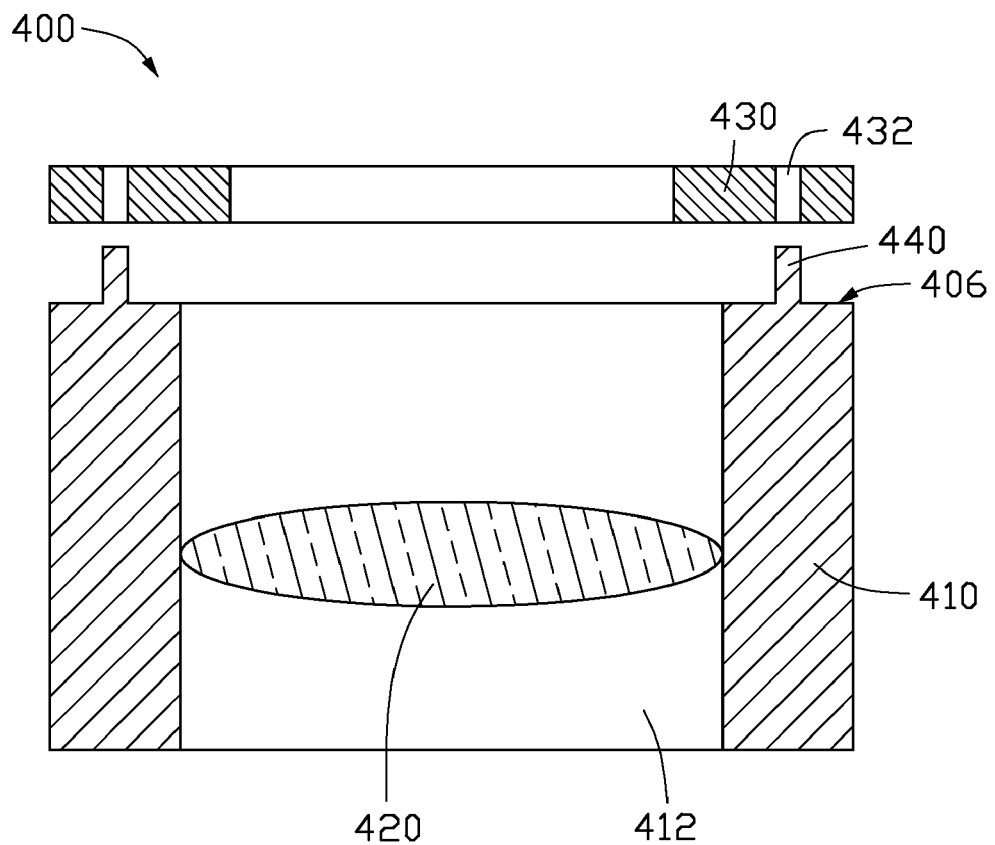
FIG. 7 is a cross-sectional view of a lens module in accordance with a fourth embodiment.

Referring to FIG. 7, a lens module 400 slightly different from the lens module 300 is illustrated. The lens module 400 includes a lens barrel 410, a lens 420, and an anti-dazzling film 430. The lens barrel 410 defines a receiving hole 412 for receiving the lens 420. The film 430 defines at least two postholes 432. An internal lip 306 is formed on the top of the lens barrel 410. At least two positioning posts 440 protrude from the lip 406 and extend upwards parallel to the optic axis of the lens module 300. The positioning posts 340 integrate with the postholes 432 to secure the film 330 to the lens barrel 410.

Comparing to the lens module 300, the positioning posts 340 of the lens module 400 is integrally formed with the lens barrel 410.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A lens module comprising:
   a lens barrel comprising an internal lip, the internal lip being formed on the lens barrel and defining at least two first postholes extending downwards parallel to the optic axis of the lens module;
   a lens received in the lens barrel;
   an anti-dazzling film mounted to the lens barrel, wherein the anti-dazzling film defines at least two second postholes; and at least two positioning posts integrating with the first postholes and the second postholes to secure the anti-dazzling film to the lens barrel.

2. The lens module as described in claim 1, wherein the positioning posts are integrally formed with the lens barrel.

3. The lens module as described in claim 1, wherein the positioning posts protrude from the internal lip and extend upwards parallel to the optic axis of the lens module.

4. The lens module as described in claim 1, wherein the lens barrel defines a first receiving hole and a second receiving hole communicating with the first receiving hole, the first receiving hole receives the anti-dazzling film, and the second receiving hole receives the lens.

5. The lens module as described in claim 4, wherein the diameter of the first receiving hole is larger than that of the second receiving hole, and the internal lip connects an inner sidewall of the first receiving hole to an inner sidewall of the second receiving hole.

6. The lens module as described in claim 1, wherein the internal lip is formed on the top of the lens barrel.

* * * * *